June 12, 1923.  1,458,433
J. B. NEIL
COTTON PICKER
Filed Nov. 14, 1919   13 sheets-sheet 6

Fig. 10.

Patented June 12, 1923.

1,458,433

UNITED STATES PATENT OFFICE.

JOSEPH B. NEIL, OF YORK, SOUTH CAROLINA, ASSIGNOR OF ONE-THIRD TO CHARLES L. COBB, OF ROCK HILL, SOUTH CAROLINA, AND ONE-THIRD TO J. C. WILBORN, OF YORK, SOUTH CAROLINA.

COTTON PICKER.

Application filed November 14, 1919. Serial No. 337,946.

*To all whom it may concern:*

Be it known that I, JOSEPH B. NEIL, a citizen of the United States, residing at York, in the county of York and State of South Carolina, have invented a new and useful Cotton Picker, of which the following is a specification.

This invention relates to machines for picking cotton and is designed more particularly as an improvement upon the structure disclosed in my Patent Number 1,323,089, issued to me on November 25, 1919.

One of the objects of the invention is to simplify and otherwise improve upon the means employed for collecting the picked cotton and depositing it into a receiver, the means utilized for this purpose being automatic in operation, formed of few parts, and very efficient in action.

A further object is to simplify the construction of the driving mechanism employed for actuating the members of the picking units.

Another object is to improve upon the construction of the main frame of the machine.

A still further object is to provide an improved form of picking element.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the claims.

In the accompanying drawings the preferred forms of the invention have been shown.

In said drawings—

Referring to the figures by characters of reference, 23 designates side beams on which are secured front and rear arches 24 and 25 provided with braces 26. Spacing blocks 27 are secured to the inner sides of the beams 23 and are connected at their inner ends by supplemental beams 28. The beams 23 and 28 carry short axles 29 on which are mounted the rear supporting wheels 30. The top portions of the two arches are connected by top beams 31 which preferably converge rearwardly as shown.

Extending forwardly from the top of the arch 24 at the sides thereof are arms 32 the forward ends of which are offset upwardly as shown at 33. Brackets 34 are extended forwardly from the sides of the arch 24 and are provided with bearings 35 in which stems 36 are mounted to slide and rotate. Each stem has a laterally extending spindle at its lower end, as shown at 37, on which one of the front supporting wheels is mounted for rotation. These wheels have been indicated at 38. The upper portions of the stems are journaled in the offset ends of the arms 32 and within the ends of a transverse beam 39, there being a collar 40 adjustably mounted on each stem and which supports one end of the said beam 39. Feathered on the upper portions of the stems are sleeves 41 having forwardly extending arms 42 to the front ends of which are pivotally connected the ends of a cross strip 43. A tongue receiving bracket 44 is secured to the bottom of the strip 43 at the center thereof and has a bolt 45 for engaging a tongue not shown. The rear end of the tongue is adapted to be pivotally connected to a bracket 46 extending over the beam 39 at the center thereof and which may constitute a fulcrum on which the said beam 39 may rock. When the draft tongue, not shown, is in position it will, when swung to the right or to the left, cause a corresponding movement of the wheels 38 so that the machine will thus be properly steered. Suitable front braces 47 may be connected to the brackets 34 and to the bracket 46 for reinforcing the said parts.

Extending longitudinally within the transverse upper portion of the front arch 24 is a shaft 48 provided at one end with actuating means, such as a crank 49. This shaft has a longitudinal key seat 50 and is slidably engaged by a gear 51 adapted to rotate with the shaft. One of these gears is located at each side of the center of the said shaft and each gear is journaled in a forked bracket 52 secured to a slide 53 which is suspended from and slidable on the shaft 48. A hanger 54 extends downwardly from each slide and journaled in the lower portion of each hanger and in the slide at the upper end of a hanger is a vertical shaft 55 provided at its upper end with a gear 56 meshing constantly with the adjacent gear 51. Thus it will be seen that by rotating the shaft 48 the gears 51 will simultaneously rotate the gears 56 and shafts 55. The lower ends of the shaft 55 are screw threaded, as shown at 57.

Secured to the sides of the arch 24 at the top thereof, are brackets 58 and extending from one of these brackets is a stud 59 on which is journaled a sprocket 60. A shaft 61, which extends throughout the length of the machine, is journaled at its front end in the other bracket and has a sprocket 62 secured thereto. An endless chain 63 is mounted on the two sprockets and one of the slides 53 is connected to the upper half of the chain, as shown at 64 while the other slide is connected to the lower half of the chain, as shown at 65. A hand wheel 66 is provided at the rear end of the shaft 61 and by means thereof the shaft 61 can be rotated and the chain driven so as to move the slides 53 toward or from each other.

Extending through the rear arch 25 at the sides of the center thereof are threaded stems 67 having adjusting wheels 68 thereon and bearing downwardly on the arch. Supporting rods 69 extend downwardly from the stems 67 and are adapted to swing relative thereto. The lower ends of the rods are pivotally engaged by eye-bolts 70.

Opposed picker frames 71 extend under the arches 24 and 25 and are provided with forwardly extending ears 72 engaged by the threaded portions 57 of the shafts 55. Additional ears 73 are extended rearwardly from the frames and are secured to the bolts 70. Thus it will be seen that by rotating the shafts 55 by the means heretofore described the front ends of the picker frames can be raised and lowered; by actuating the chain 63 said front ends can be moved toward or from each other; and by pushing or pulling on the rear ends of the frames they can be moved from or toward each other. Also by adjusting the stems 67 longitudinally the rear ends of the frames can be raised or lowered. Springs 74 are used to connect the upper ends of the frames 71, at the back ends thereof, to the sides of the arch 25, and toggles 75 connect these frames 71 to the said arch 25, one of the links of each toggle being bowed and bearing normally upon the adjacent beam 28. These links have foot plates 76 adapted to be engaged and actuated by the operator.

Arranged in each of the picker frames is a series of superposed picking units and as the units in the two frames are the same and all have the same driving mechanism, it is only necessary to described the units of one group and the operating mechanism therefor.

Frame 71 is provided at its rear end and at a point set back from its front end, with skeleton frames 77 and 78 respectively, there being an additional frame 79 at the front end of the frame 71. Bearings 80 are arranged in vertical alinement on the frame 78 and similar bearings 81 are mounted on the rear frame 77. In these bearings are journaled shafts 82 extending from the ends of cylinders 83 provided with radial doffing teeth or fingers 84 and which toothed cylinders constitute doffing means. Sleeves 85 are mounted to rotate in the bearings 80 and 81 and the shafts 82 extend therethrough. Each of these sleeves is formed with a lever 86 one end of which extends outwardly into the frame 71 while the other end thereof has bearings 87 and 88 for the spiral roll 89 and the picker roll 90, respectively. The spiral roll is preferably formed of a tube having a wire wrapped spirally therearound, as shown at 91, there being bearing pins 92 secured in the ends of the tube and journaled in the bearings 87. These spiral rolls are designed to press backwardly upon the branches and twigs engaged thereby so as to offset the drag which would otherwise be produced by the forward motion of the machine. The function of this roll is the same as that disclosed in my patent hereinbefore mentioned.

Each picker roll is formed preferably of a pipe having a V-shaped groove cut spirally therearound as shown at 93, said groove being intersected by an oppositely pitched spiral groove 94 rounded and slightly undercut so that picking points are thus produced at the points of intersection whereby, as the roll 90 revolves these points will engage the fibres of the bolls contacting therewith and pull them from the plants.

A cylindrical housing 95 is connected to and mounted between the levers of each doffing cylinder, this housing being concentric with the doffing cylinder and having a longitudinal slot 96 into which the picker roll projects. Another wider slot 97 is located opposite to the slot 96 and opens into the space in the frame 71.

Figures 15, 16, 17:
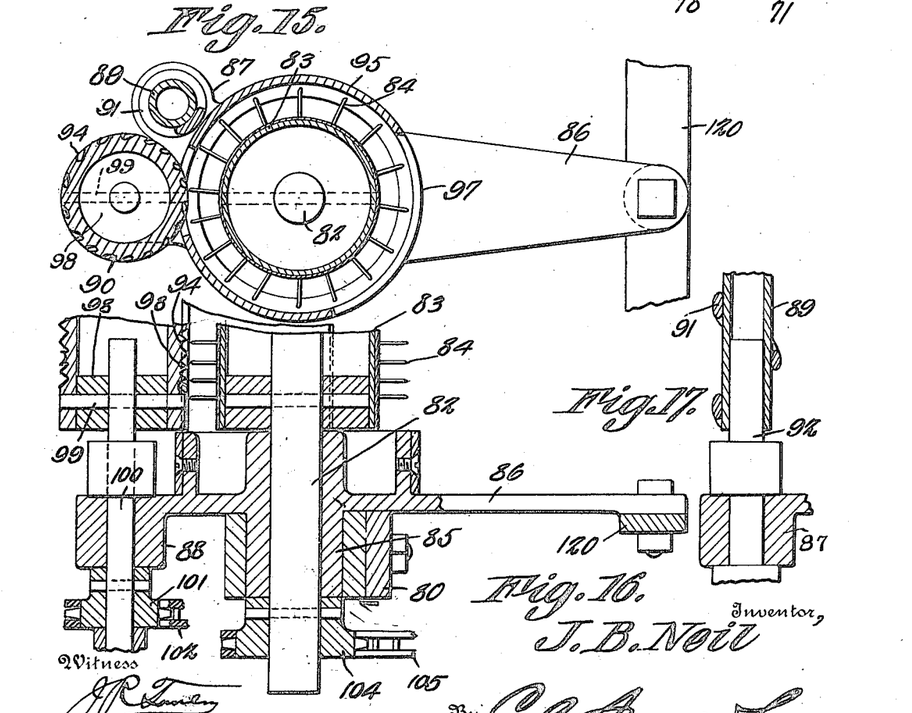
Figure 15 is a section on line 15—15, Figure 13.
Figure 16 is a section on line 16—16, Figure 14.
Figure 17 is a section on line 17—17, Figure 14.
Figure 18:
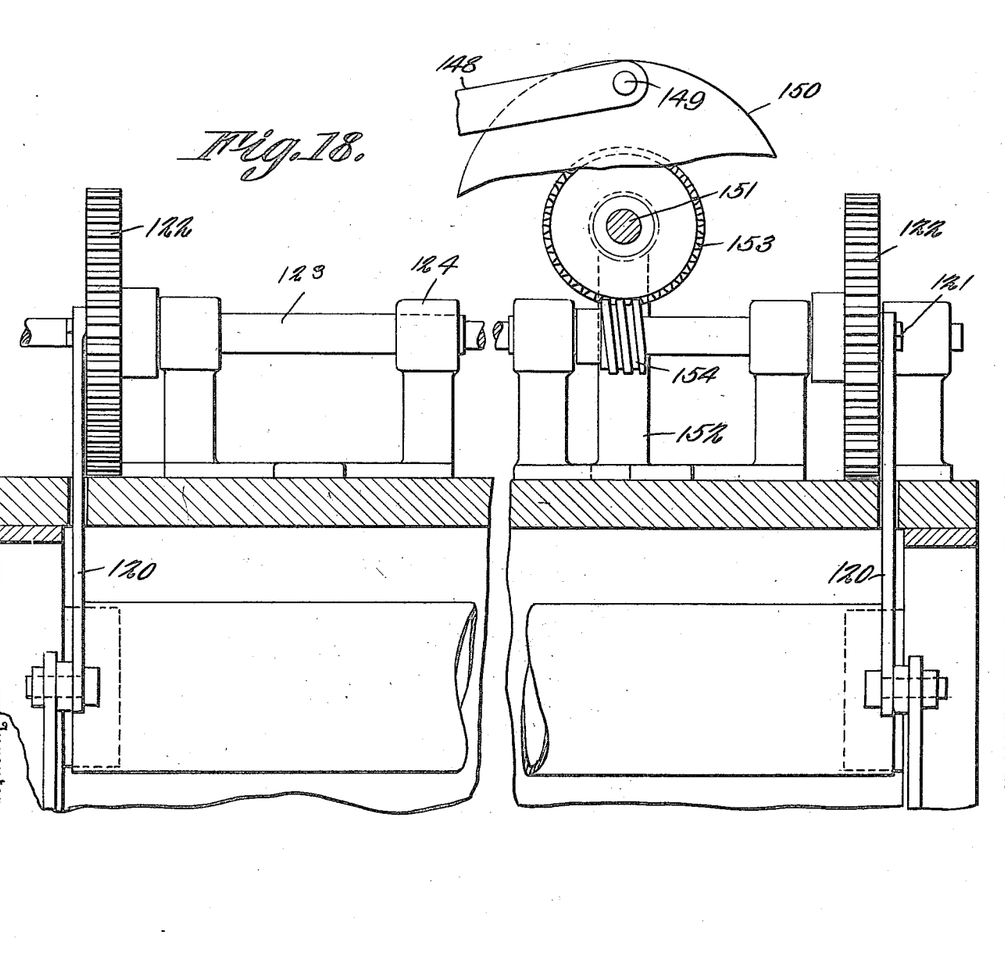
Figure 18 is a section on line 18—18, Figure 2.
Figure 19:
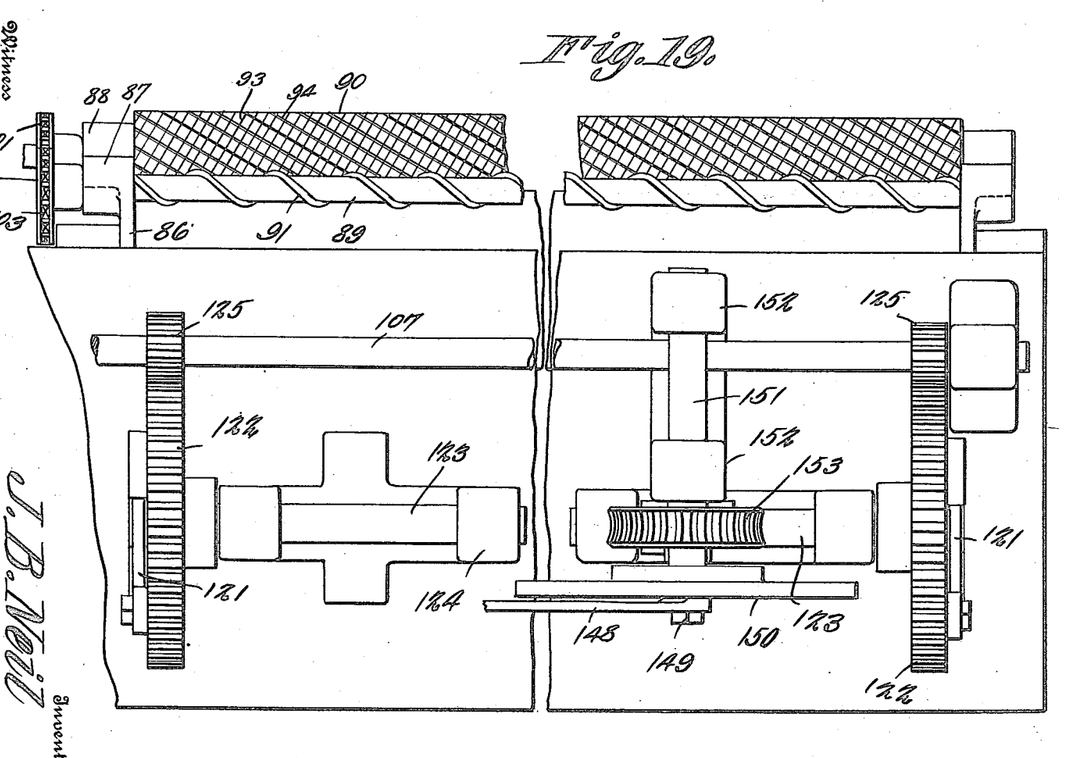
Figure 19 is a plan view of the structure shown in Figure 18.

Each picker roll is closed at its ends by plugs 98 fastened in place by pins 99 or in any other suitable manner. Bearing pins 100 extend from these plugs and are journaled in the bearings 88. One end of a picker roll 90 has been shown in section at the left of Figure 16 to illustrate a plug secured therein. The forward pin 100 of each picker roll has a sprocket 101 secured thereto and an endless chain 102 transmits motion from this sprocket to another sprocket 103 secured to the front pin 92 of the adjacent spiral roll 89 thereabove.

Figure 11:
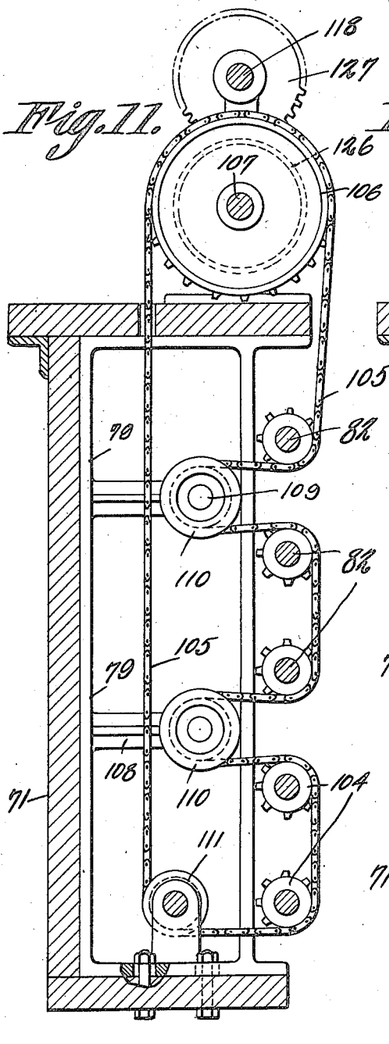
Figure 11 is a section on line 11—11, Figure 10.
Figure 12:
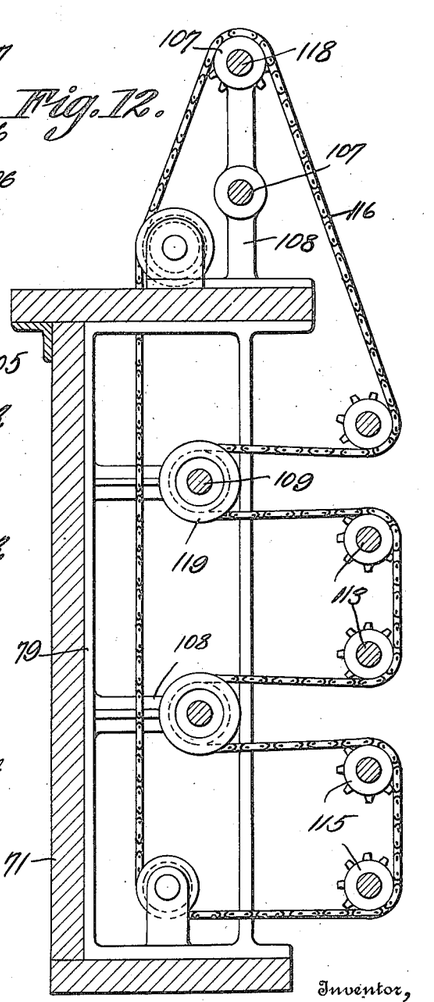
Figure 12 is a section on line 12—12, Figure 10.
Figure 13:
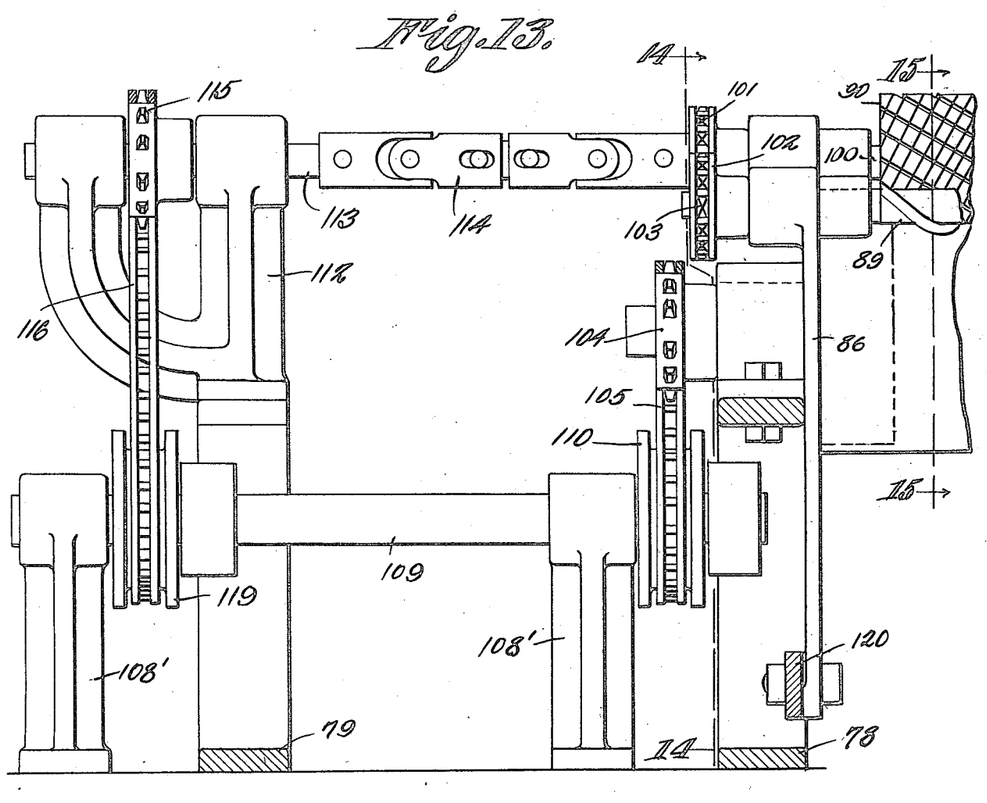
Figure 13 is a section on line 13—13, Figure 10.
Figure 14:
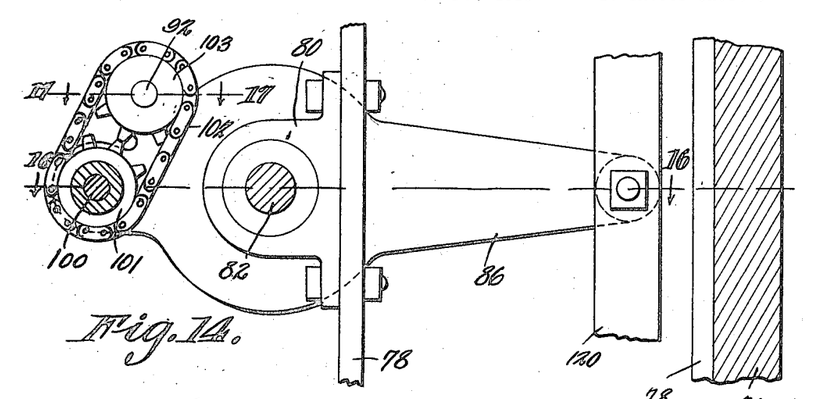
Figure 14 is a section on line 14—14, Figure 13.

Secured to the front end of each shaft 82 is a sprocket 104 and the sprockets 104 of the doffing cylinders at each side of the machine are engaged by a single endless chain 105 suspended from and driven by a sprocket 106 secured to a longitudinal shaft 107 which is journaled in bearings 108 on the top of frame 71 and extends throughout the length of said frame. Horizontally extended brackets 108' (see Figure 13) are carried by the frame 71 and are arranged in pairs, the brackets of each pair supporting a shaft 109 on which is loosely mounted an idler pulley 110. These pulleys are set back from the line of the sprockets 104 so that the chain 105 passes under one sprocket in the form of a loop which extends partly around the adjoining pulley or wheel 110 and thence down into engagement with the next sprocket. See Figure 11. An idler 111 is placed at the bottom of the frame 71 and the chain passes thereunder and thence upwardly to the drive sprocket 106. From the foregoing it will be seen that all of the doffing brushes will be rotated simultaneously and in the same direction.

Journaled in bearings 112 on the front frame 79 are short shafts 113 each of which is connected by a telescopic and universal coupling 114 to the front bearing pin 100 of a picker roll. Sprockets 115 are secured to the shafts 113 and are engaged by an endless chain 116 supported and driven by a sprocket 107 secured to a shaft section 118 journaled in bearings 108 at the front end of frame 71. Idler wheels 119 are mounted on the shafts 109 and are engaged by loops of the chain 116 and which loops are extended laterally between certain of the sprockets 115. From the foregoing it will be seen that the picker rolls can be moved upwardly and downwardly and yet be driven by the chain 116.

For the purpose of imparting an up and down oscillation to the picking units during the rotation of the picking and doffing mechanisms, the levers 86 at each end of the units are connected by strips 120 extending upwardly through the tops of the frames 71 and connected to wrist pins 121 on gears 122 secured to longitudinal shafts 123, journaled in bearings 124 on the top of frame 71. The gears 122 mesh with smaller gears 125 on the shaft 107 with the result that, as said shaft 107 is rotated for the purpose of driving the doffing mechanism, as hereinbefore described, it will also cause the levers 86 to oscillate vertically.

Shaft 107 receives its motion through gears 126 and 127 from the shaft section 118, and said shaft section is connected by a universal joint 128 to an intermediate shaft section 129. Another universal joint 130 connects the section 129 with a rear shaft section 131 journaled on the rear arch 25. A sprocket 132 is secured to each section 131 and chains 133 connect these sprockets with sprockets 134 secured to the shaft 135 of an engine 136.

A blower casing 137 is mounted on a supporting structure 138 and the shaft of the blower in the casing has a pulley 139 receiving motion to a belt 140 from a pulley 141 on the shaft 135.

Mounted on the outer sides of the frames 71 and extending upwardly therefrom are frames 142 having guide pins 143 extending inwardly therefrom. A toggle 144 is mounted at its lower end on each frame 71 and its upper link is slotted longitudinally, as shown at 145, and is adapted to slide and swing on the pin 143. Suction pipes are secured to the upper links of the toggles so as to swing therewith, as shown at 146 and each of these pipes extends downwardly into the frame 71 adjacent thereto and back of the picking units and is adapted to swing longitudinally of the frame 71, as shown by dotted lines in Figure 20. Flexible pipes 147 connect the pipes 146 to the inlet of the casing 137. A pitman 148 connects the middle joint of each toggle 144 with a wrist pin 149 on a disk 150. This disk is secured to a shaft 151 journaled in a bearing 152 and having a gear 153 thereon. Said gear receives motion from a worm 154 secured to and rotating with one of the shafts 123. Thus it will be seen that as the shafts 123 rotate to oscillate the picking units vertically, motion will be transmitted to the toggles 144 with the result that the pipe 146 will be swung back and forth, collecting the cotton thrown into the frame 71 by the doffing means and carrying it upwardly and thence to a collecting box 155 mounted on one side of the machine and having a foraminous wall. By mounting the pipes 146 in the manner shown and described, their lower ends will be maintained approximately at the same distance from the bottoms of the frames 71 at all times during the oscillation of said pipes 146.

Figure 22:
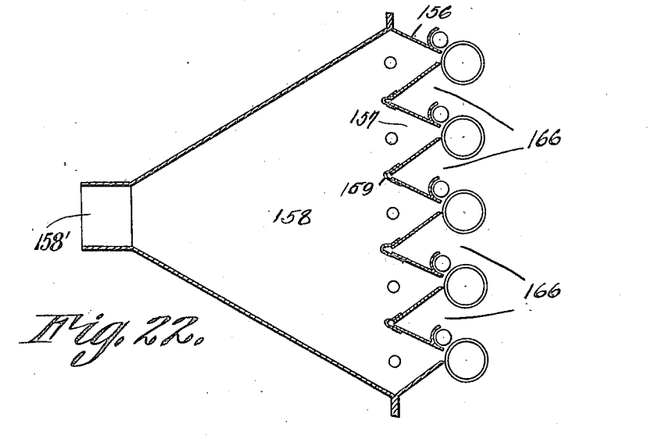
Figure 22 is a vertical transverse section through a modified form of doffing and gathering mechanism.

Instead of providing the doffing cylinders in the picking units such as have been described a modified structure such as shown in Figure 22 could be employed. In this form of machine rearwardly or outwardly diverging upper and lower walls 156 extend from the opening into which the picking rolls project and the receiving spaces thus provided and which have been indicated at 157, open into a suction chamber 158 the upper, lower, front and rear walls of which are secured to the picker frame 71 in lieu of the housing of the structure heretofore described and converge outwardly to an outlet flue 158'. Spring strips connect the bottom plates 156 of the different picking units with the top plates of the next adjoining units, or these strips can be of rubber or fabric. They have been shown at 159 and serve to seal the joints between the units.

Figures 23, 24:
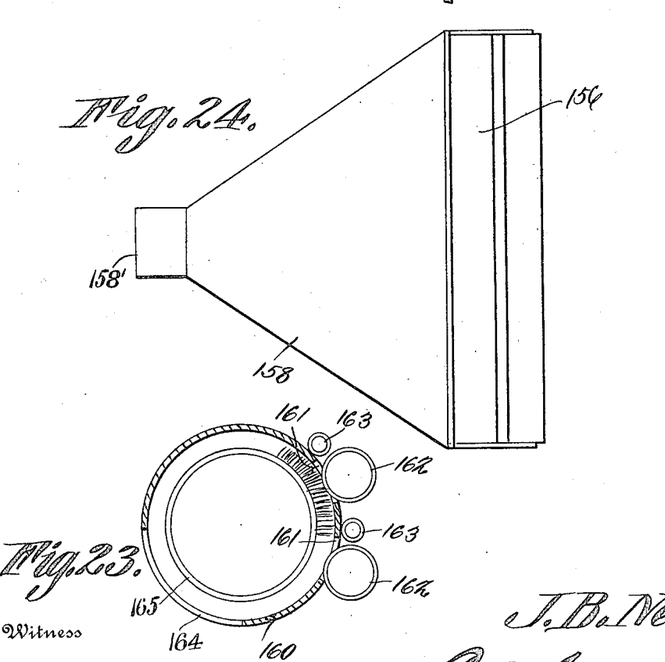
Figure 23 is a section through a modified form of picking unit.
Figure 24 is a plan view of the structure shown in Figure 22.

In Figure 23 has been shown another modified structure in which a single doffing cylinder is used with two picking rolls. In this form of the device, which can be substituted for the picking units heretofore described, the cylinders 160 are made of larger diameter than the corresponding cylinders already described. Each cylinder has two inlet slots 161, arranged one above the other and a picker roll 162 projects into each slot. Adjacent each picker roll is a spiral 163 such as hereinbefore described. A large outlet slot 164 is provided in the opposite portion of the cylinder and the single doffing cylinder 165 in the cylindrical housing 160 will remove cotton from the two picking rolls and discharge it through the opening 164.

Figure 1:
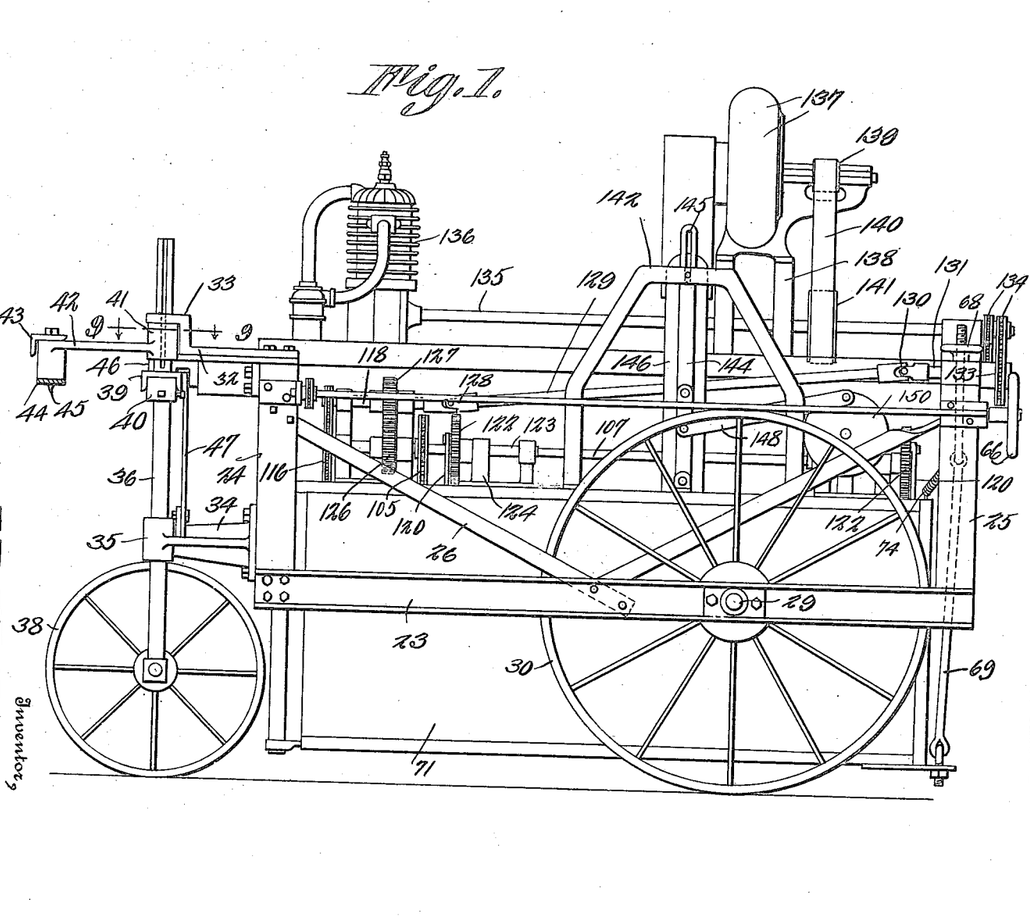
Figure 1 is a side elevation of the machine.
Figure 2:
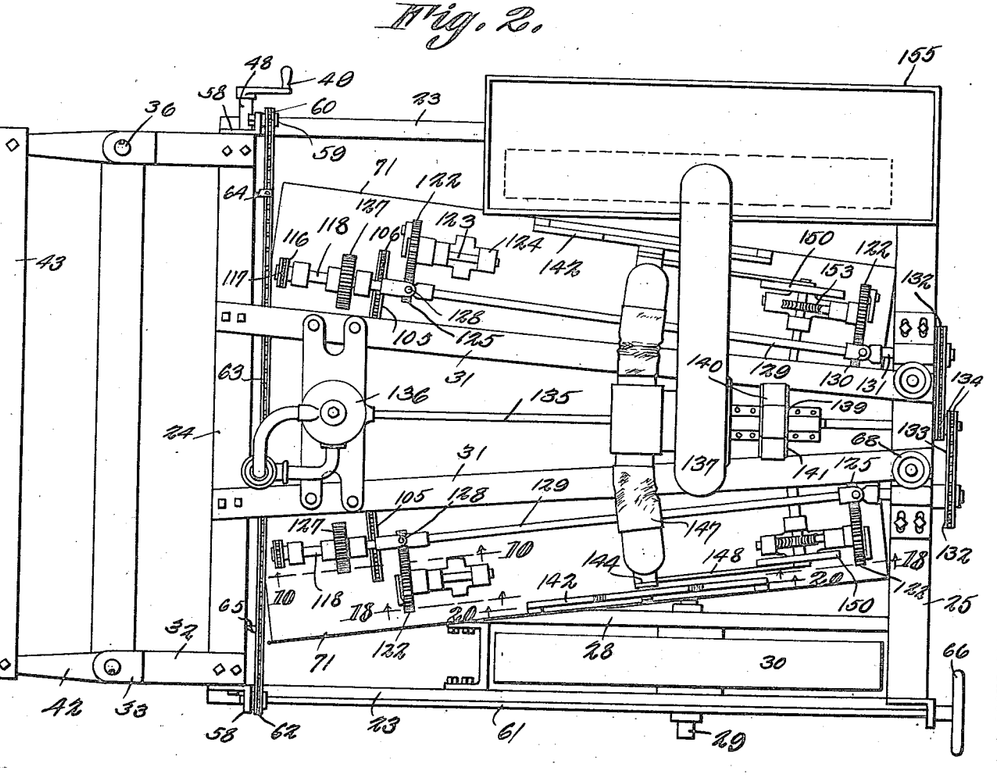
Figure 2 is a plan view thereof.
Figure 3:
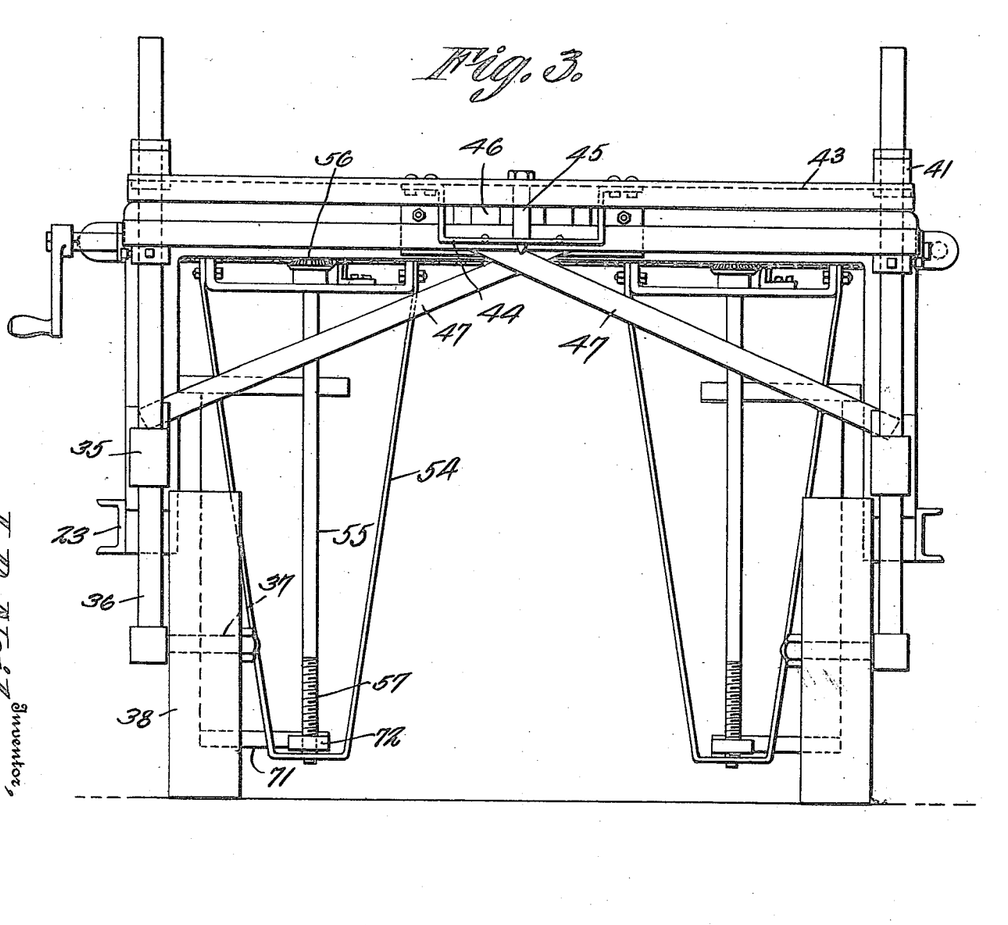
Figure 3 is a front elevation of the frame and its steering mechanism, the picking mechanism, motor, etc. being removed.
Figures 4, 25:
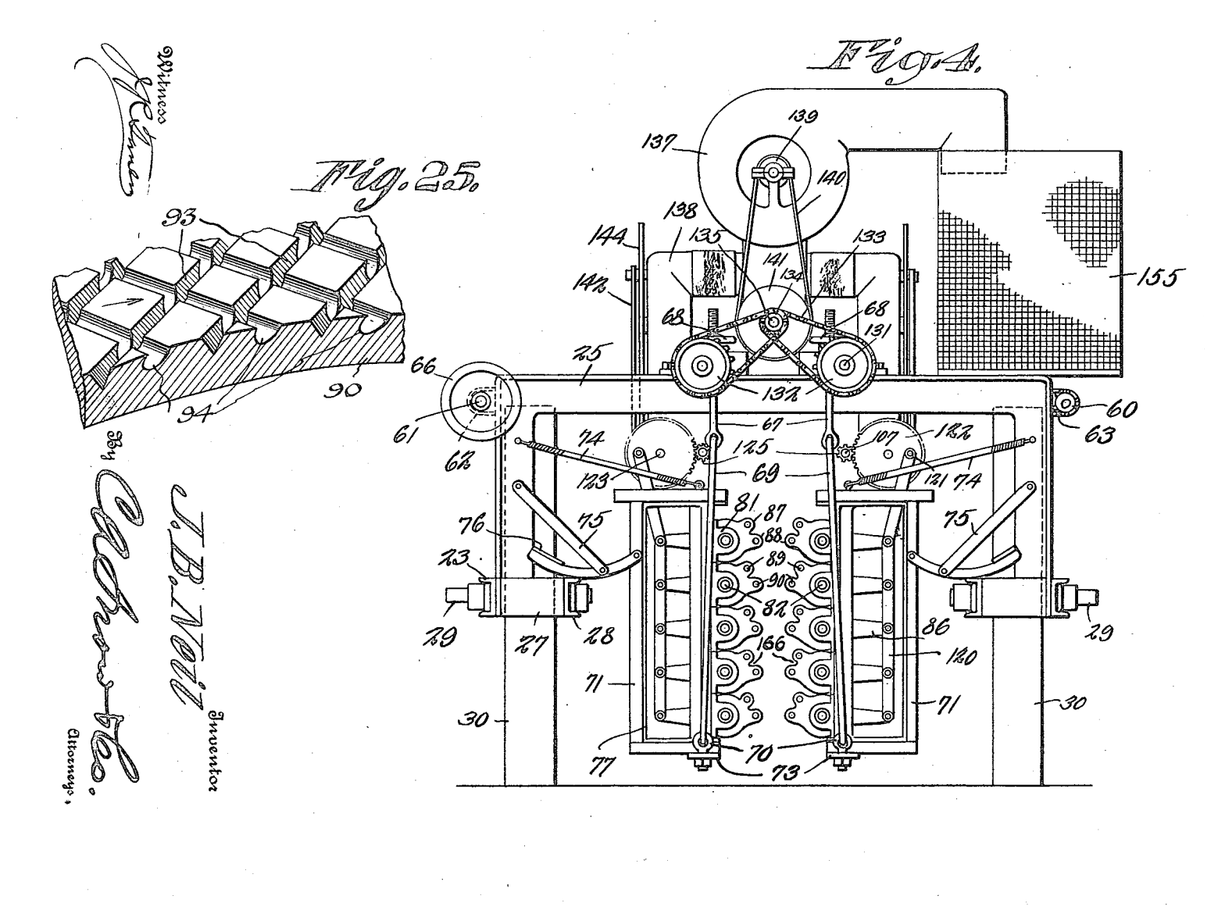
Figure 4 is a rear elevation.
Figure 25 is a perspective view of a portion of one of the picking rolls and showing the arrangement of grooves therein for forming the teeth.
Figures 5, 6:
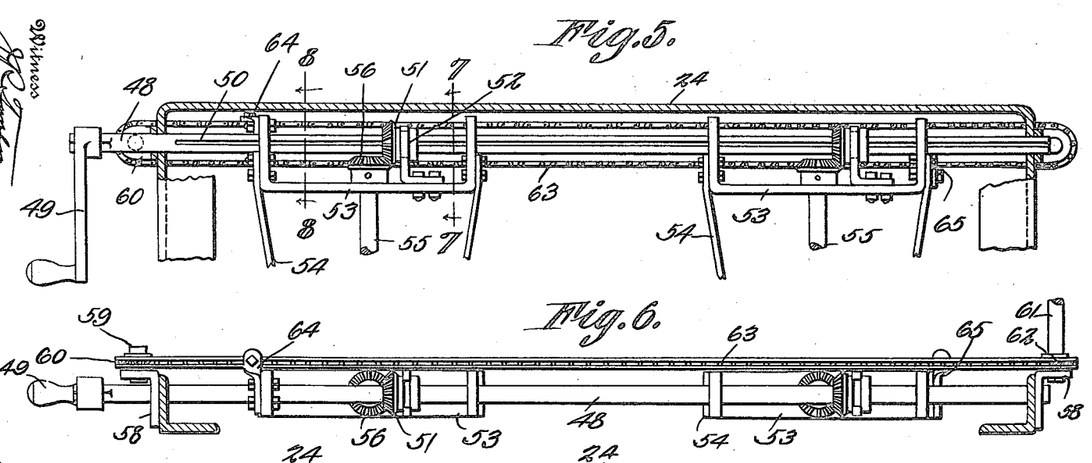
Figure 5 is a vertical transverse section through the mechanism for adjusting the front ends of the picker frames.
Figure 6 is a plan view of said mechanism.
Figure 7:
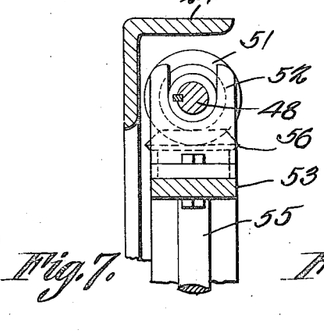
Figure 7 is a section on line 7—7, Figure 5.
Figure 8:
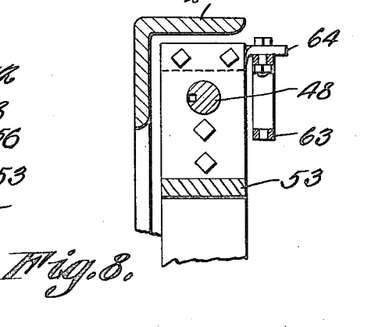
Figure 8 is a section on line 8—8, Figure 5.
Figure 9:
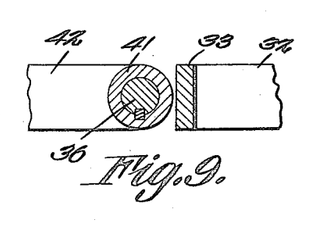
Figure 9 is a section on line 9—9, Figure 1.
Figure 10:
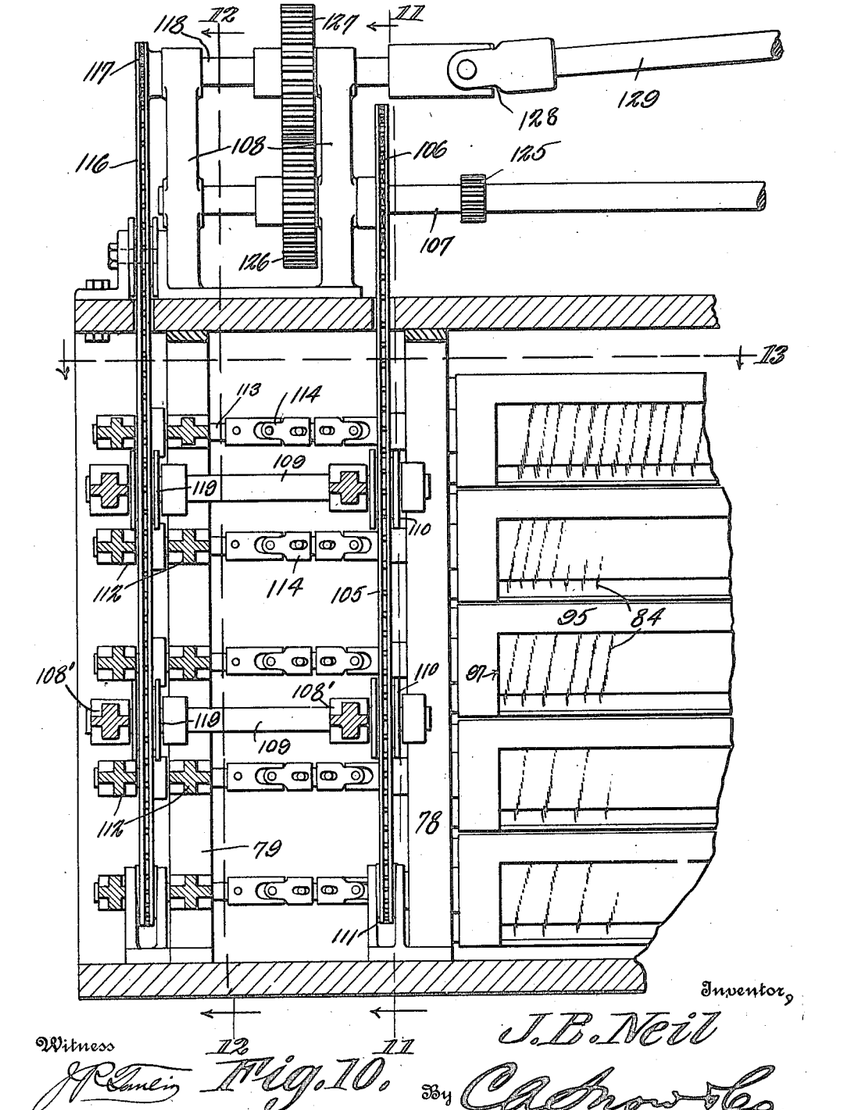
Figure 10 is an enlarged section on line 10—10, Figure 2.
Figures 20, 21:
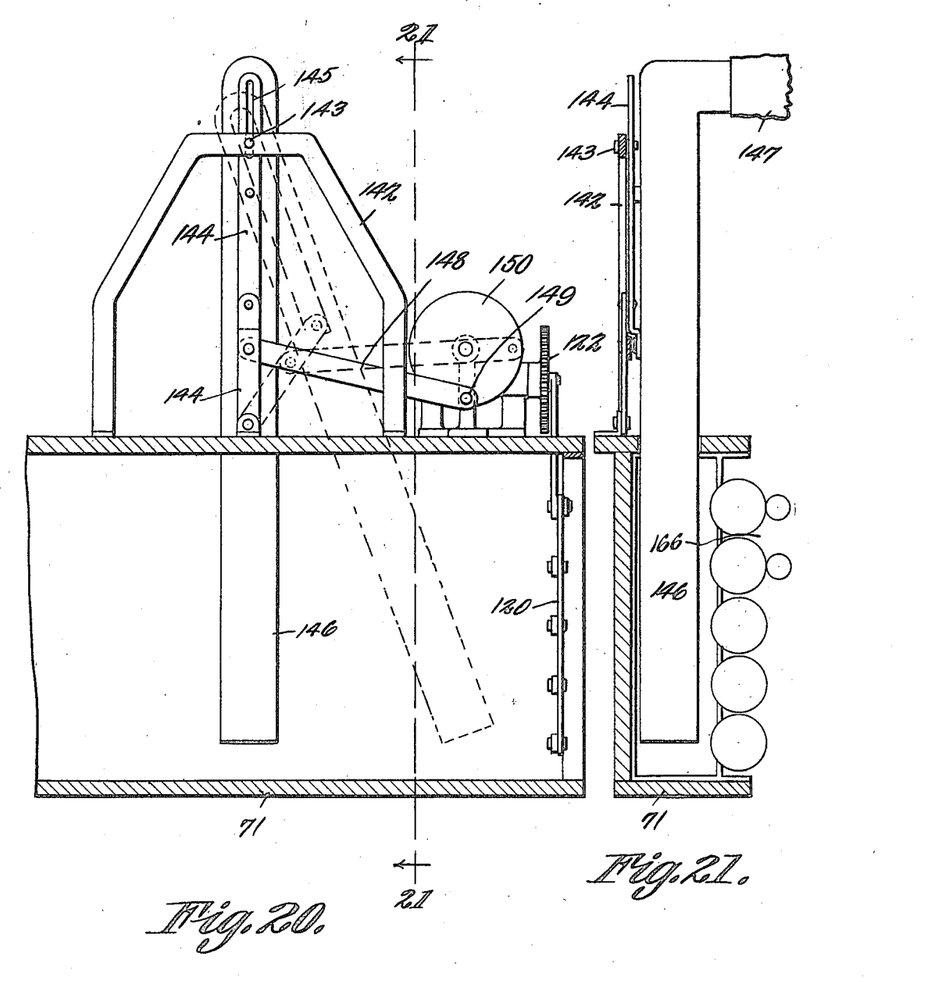
Figure 20 is a section on line 20—20, Figure 2.
Figure 21 is a section on line 21—21, Figure 20.

Attention is called to the fact that in the machine shown and described there is provided a longitudinally extending clearance or "recess" 166 between the rolls of adjoining picking units, this being particularly noticeable by referring, for example, to Figures 4, 21 and 22 of the drawings. These "recesses" 166 extend throughout the length of the units and allow the limbs of the cotton plants to pass under and over the picking rolls and enables the limbs of the plant to pass freely out of the machine after the cotton has been removed therefrom. Both the upper and the lower portions of the limbs can thus be "worked" or picked and bolls presented upwardly will be picked as thoroughly as those presented downwardly.

By forming the teeth on the picker rolls in the manner heretofore described the points of the teeth will move forwardly into the cotton bolls during the advance of the machine, this action being facilitated because of the fact that the opposed series of picking units diverge forwardly.

What is claimed is:—

1. In a cotton picker a wheel supported structure, opposed groups of picking units suspended the therefrom, a suction pipe mounted for oscillation back of each group of units, and means for creating a suction through the pipe to carry off picked cotton.

2. In a cotton picker a wheel supported structure, opposed groups of picking units suspended therefrom, a suction device, suction pipes connected to said device and extending back of the respective groups of picking units, means for oscillating said pipes during the operation of the picking units, and means for maintaining the pipes at approximately the same distance from the bottoms of said groups of units during the oscillation of the pipes.

3. In a cotton picker a portable structure, opposed groups of picking units carried by said structure, a suction device, suction pipes connected thereto and mounted for oscillation back of the respective groups of units, a toggle support for each pipe, a guide for each pipe, and means for actuating the toggles to oscillate the pipes.

4. In a cotton picker a portable structure, opposed groups of picking units carried by said structure, a suction device, suction pipes extending back of the respective groups of picking units, flexible tubular connections between said pipes and the suction device, means for oscillating the pipes in planes parallel with the picking units, and means for adjusting the groups of units toward and from each other during the suction through and oscillation of the pipes.

5. In a cotton picker a portable structure, opposed groups of picking units carried by said structure, a suction device, suction pipes mounted for oscillation back of the respective groups of picking units, and connected to the suction device, a toggle supporting each pipe, the upper link of each toggle being fixedly connected to one of the pipes, a guide for the upper link of each toggle and slidably and pivotally engaged thereby, and means for actuating the toggles to swing the pipes about a vertically movable axis.

6. In a cotton picker the combination with superposed picking units mounted for oscillation about longitudinal axes, of a shaft, means operated thereby for oscillating the units, a second shaft, speed reducing means for transmitting motion thereto from the first named shaft, a suction device, a suction pipe connected thereto and mounted for oscillation back of and parallel with the picking units, and means operated by said second shaft for oscillating the suction pipe.

7. In a cotton picker the combination with opposed groups of picking units, and means for adjusting the units toward and from each other, of a suction device, a suction pipe mounted for oscillation back of and parallel with the units of each group, a flexible connection between each pipe and the suction device, and means for oscillating the pipes in planes parallel with the units and irrespective of relative adjustment of the groups.

8. In a cotton picker the combination with a portable structure, of superposed picking units theron, each unit including a doffer, a picker roll and a spiral roll, a sprocket connected to each doffer, an endless chain engaging all of the sprockets of the doffers, sprockets connected to the picker and spiral rolls, an endless chain connecting each picker sprocket with the sprocket of its spiral roll, jointed shafts connected to the pickers, sprockets thereon, and an endless chain engaging all of the sprockets of the jointed shafts, and means for shifting the picking units relative to said chain on the sprockets of the jointed shafts.

9. In a cotton picker a picking unit including a housing having an outlet opening and separate inlet openings, picker rolls projecting into the respective inlet openings, a spiral roll adjacent to and parallel with each picker roll, means for rotating the rolls, and a single doffing element mounted for rotation in the housing for removing cotton from the picker rolls in said separate inlet openings.

10. In a cotton picker a picking roll including a tube having oppositely pitched intersecting spiral grooves forming overhanging teeth at their points of intersection.

11. In a cotton picker a picking roll including a tube having a spiral angular groove, and an oppositely pitched rounded groove having one wall undercut, said grooves forming teeth at their points of intersection.

12. In a cotton picker a picking roll including a tube having oppositely pitched intersecting spiral grooves forming teeth at their points of intersection, a plug secured in each end of the tube, and a bearing pin extending from each plug.

13. In a cotton picker opposed rearwardly converging series of picking units, the units of each series being spaced apart by recesses extending throughout the length of the units and open at their ends, said recesses adapted to receive limbs of plants spreading over and under the picking units.

In testimony that I claim the foregoing as my own, I have hereto affixed my signature in the presence of two witnesses.

JOSEPH B. NEIL.

Witnesses:
F. E. QUINN,
ROBT. WITHERSPON.